H. A. SORENSON.
STRAW SPREADER.
APPLICATION FILED MAR. 24, 1919.
1,391,019.
Patented Sept. 20, 1921.
3 SHEETS—SHEET 1.
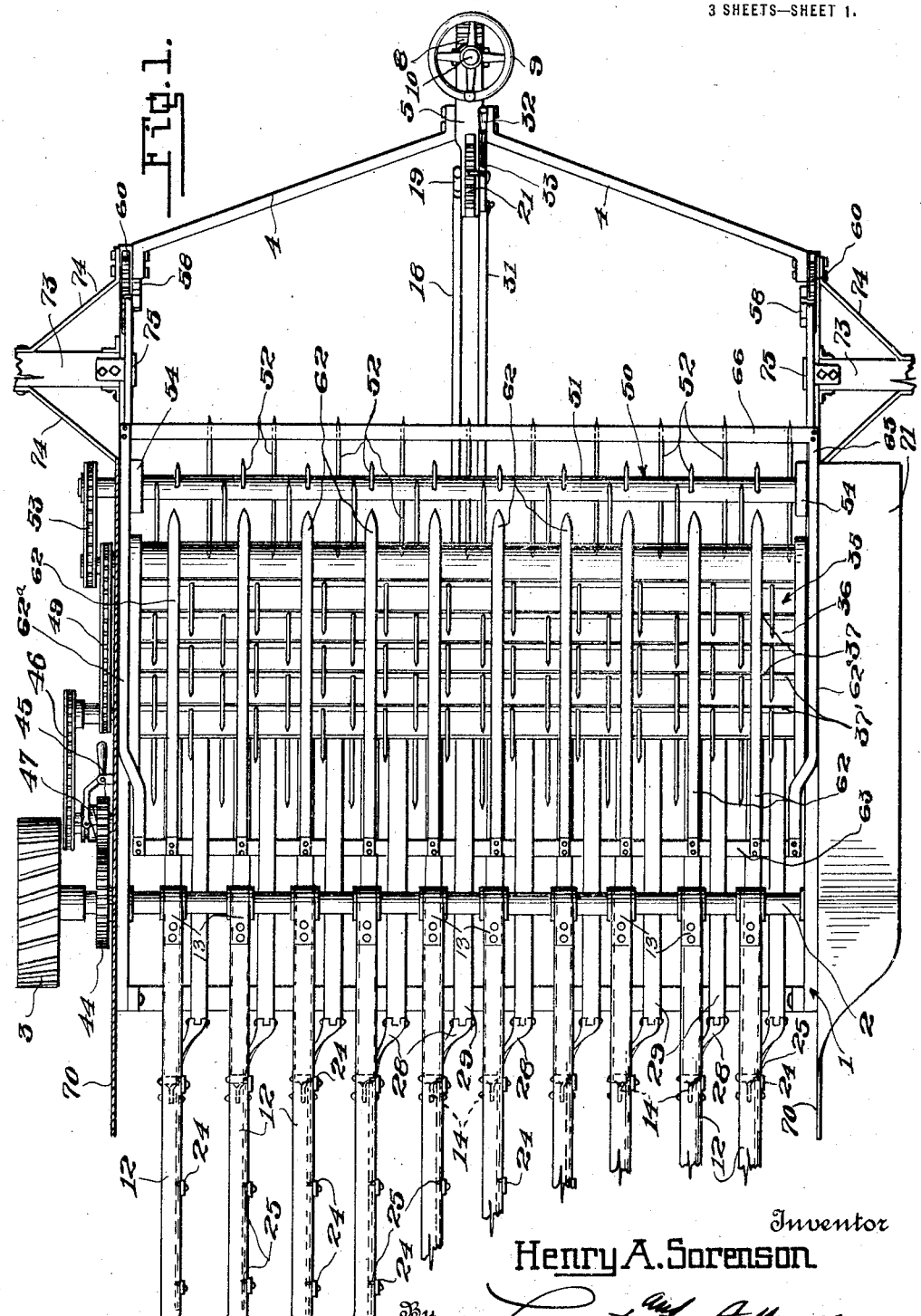
Inventor
Henry A. Sorenson

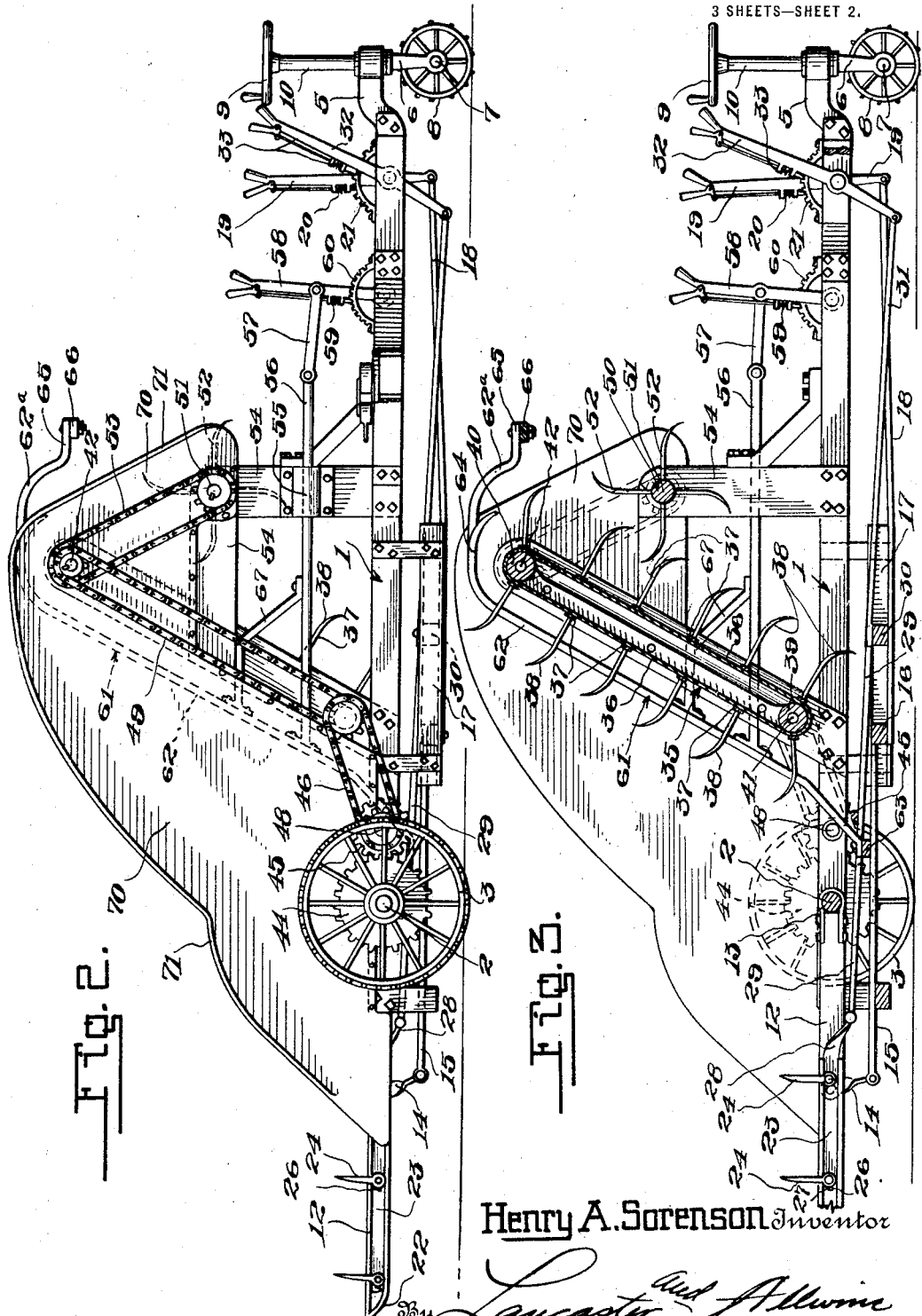

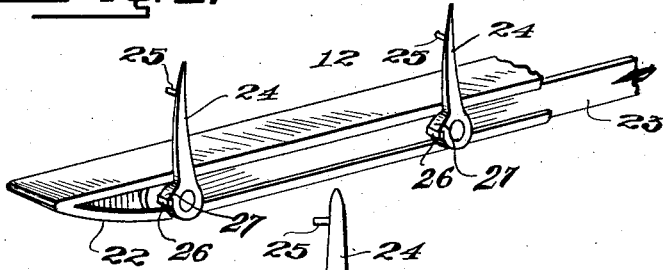
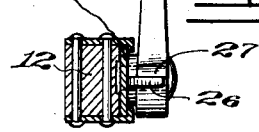
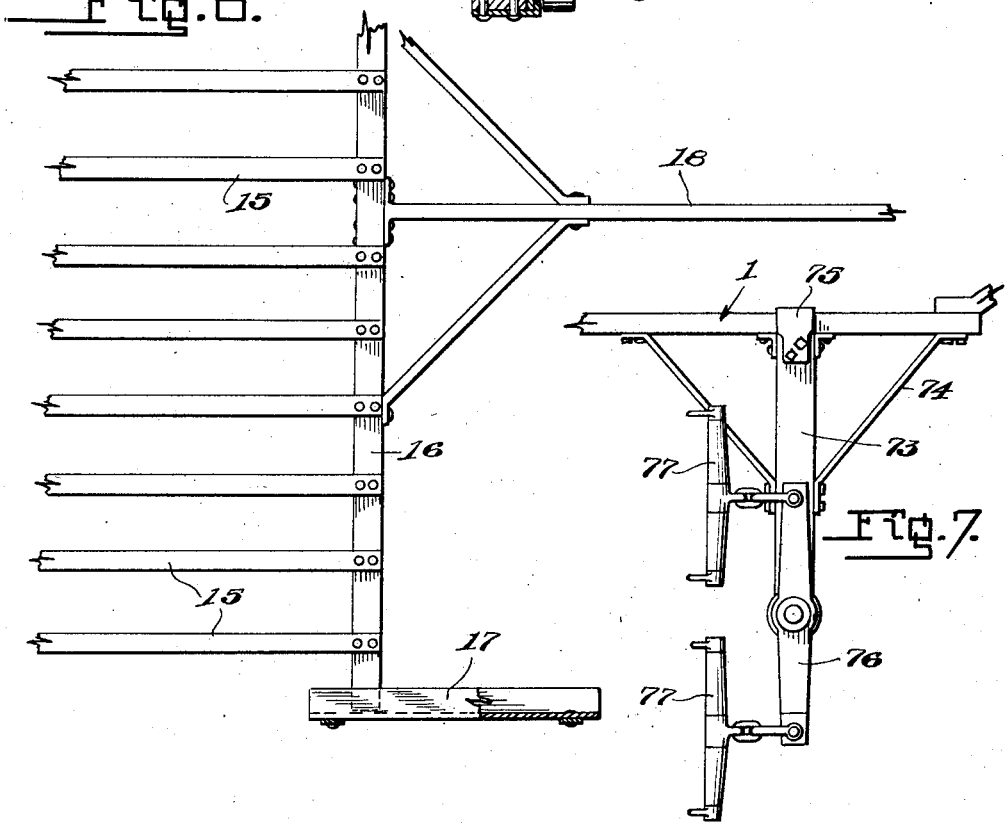

UNITED STATES PATENT OFFICE.

HENRY A. SORENSON, OF HARVEY, NORTH DAKOTA.

STRAW-SPREADER.

1,391,019.  Specification of Letters Patent.  Patented Sept. 20, 1921.

Application filed March 24, 1919. Serial No. 284,692.

*To all whom it may concern:*

Be it known that I, HENRY A. SORENSON, a citizen of the United States, residing at Harvey, in the county of Wells and State of North Dakota, have invented certain new and useful Improvements in Straw-Spreaders, of which the following is a specification.

This invention relates to a spreader for straw or similar material, and an object of the invention is to provide a spreading machine which may be forced into the stack of straw and when withdrawn will retain thereon a load of the straw, and also to provide means for spreading the straw over a field, when it is desired to scatter or spread the straw for purposes of fertilizing the ground, or the device may be used, for spreading hay over a pasture, for feeding cattle or other stock.

Another object of this invention is to provide means for controlling the operation of the spreading mechanism whereby the latter may be maintained inoperative during the transportation of the spreading machine from its loading position to the place where it is desired to scatter or spread the straw.

More specifically, the invention comprehends the provision of a straw spreader having a plurality of forwardly extending arms pivotally connected to its forward end, each of which arms slidably carry a bar having pivoted teeth, which teeth upon insertion of the arms into a straw stack move downwardly, but when the arms are withdrawn from the stack said teeth assume substantially vertical positions, for maintaining a load of straw upon the arms and further to provide means for shifting the position of said arms and also for longitudinally shifting said bars and teeth with respect to the arms for feeding the straw to an elevator structure which in turn delivers the straw to a rotary scatterer.

A still further object of the invention is to provide adjustable means for regulating the quantity of the straw delivered to the rotary scatterer by said elevator structure.
Other objects of the invention will appear in the following detailed description taken in connection with the accompanying drawings, forming a part of this specification and in which drawings:

Figure 1 is a top plan of the improved straw spreader.

Fig. 2 is a side elevation of the straw spreader.

Fig. 3 is a longitudinal section through the spreader.

Fig. 4 is a detail perspective of a fragment of one of the straw receiving arms.

Fig. 5 is a fragmentary cross section through one of the straw receiving arms showing the manner of connecting the pivoted tooth thereto.

Fig. 6 is a fragmentary plan of a part of the mechanism for shifting the slidable bars carried by said straw receiving arms, and

Fig. 7 is a fragmentary plan of the spreader illustrating the pitching or draft tree structure.

Referring more particularly to the drawings, 1 indicates the main supporting structure of the straw spreader which carries a front axle 2 upon which is mounted suitable supporting wheels 3. The rear end of the supporting frame 1 has rearwardly converging bars 4 attached thereto, to the rear ends of which is connected a bearing and support 5. This bearing support 5 rotatably supports a yoke 6, the lower end of which carries a rear axle 7 upon which the rear steering wheel 8 of the straw spreader is mounted. A hand steering wheel 9 is connected to the stem 10 of the yoke 6 and is provided to permit manual steering of the straw spreader.

A plurality of forwardly extending laterally spaced arms 12 are pivotally connected, by means of straps 13 to the front axle 2 and each of these arms has a depending twist link 14 connected thereto, to the lower end of which a bar 15 is connected. The bars 15 are in turn connected to a cross bar 16 which is slidably supported by a suitable guide 17 suspended beneath the body 1. The brace bars 18 are connected to the cross bar 16 and to a hand lever 19 below the pivot of the said lever. The hand lever 19 is pivotally supported by the supporting member 5, and it carries the usual type of dog mechanism 20 co-acting with a quadrant 21 to maintain the lever in adjusted pivotal position, for maintaining the arms 12 in adjusted pivotal positions with respect to the front axle 2. The forward end of the arms 12 are curved upwardly toward their upper edges, as shown at 22, to provide runner-like structure and a bearing, which will not gouge into the ground, when the arms 12 are lowered to their lowermost positions and so that this curved portion will ride over the surface of the ground upon which the straw spreader is traveling.

Each of the arms 12 is provided with guide ways along one side, which guide ways slidably receive bars 23. The bars 23 each have a plurality of tines or fingers 24 pivotally connected thereto and these tines or fingers are adapted to fold downwardly upon the insertion of the arm into a stack of straw or analogous material. The downward folding movement of the fingers or tines is limited by pins 25, and the said tines are curved so that the points thereof will be maintained above the upper surfaces of the arms 12, causing the fingers or tines to extend into the straw or hay when the arms are withdrawn, for holding a load of hay upon the arms and segregating it from the stack. The tines or fingers 24 are prevented from moving downwardly and outwardly below a vertical position, by suitable stop pins 26 carried by the bars 23 and engaging lugs 27 formed upon the barrels of the said fingers.

The arms 23 have their rear ends twisted and bent downwardly as shown at 28 and these downwardly bent ends have connection with the bars 29 which are in turn connected to a cross bar 30, the ends of which are slidably seated in the guides 17. A brace bar 31 is connected to the cross bar 30 and to a hand lever 32 below the pivots thereof. The hand lever 32, like the hand lever 19 is pivotally connected to the supports 5 and carries a dog mechanism 33 of the usual construction which co-acts with the quadrant 21, for maintaining the lever 32 and consequently the bars 23 in adjusted positions.

The straw or analogous material is received from the arms 12 by an elevator structure 35. The elevator structure 35 includes an endless belt or conveyer 36 having a plurality of flights 37 attached thereto at spaced intervals to each of which flights a plurality of tines 38 are attached. The outer ends of the tines 38 are preferably curved to present their concaved portions upwardly when traveling upwardly with the endless belt 36. The endless belt 36 travels over the rollers 39 and 40 which are in turn supported by suitable shafts 41 and 42 respectively. The shaft 41 has connection with the main axle 2 of the spreader through the medium of gears 44 and 45. The gear 45 is carried by a stub shaft which is supported by the frame, and this stub shaft has sprocket and chain connection as shown at 46 with the shaft 41. A suitable clutch mechanism 47 is provided for controlling the operation of the shaft 41 by the rotation of the stub shaft 48 upon which the gear 45 is mounted. The shaft 41 is operatively connected to the shaft 42 for rotating the latter by means of sprockets and a chain 49. The straw or analogous material is delivered from the upper end of the elevator structure 35 upon a rotary spreader or scatterer 50. This rotary spreader or scatterer 50 comprises a main core 51 which has a plurality of teeth or tines 52 carried thereby in longitudinally spaced rows, the teeth in one row being staggeredly disposed with respect to the teeth in the row next thereto. The rotary scatterer 50 is rotated from the shaft 42 through the medium of a suitable power transmitting connection, such as sprockets and a chain as indicated at 53. The core or shaft 51 of the rotary scatterer is supported by suitable supporting structures 54 which have bearings 55 attached thereto for supporting the bars 56, for slidable movement. The bars 56, are positioned one upon each side of the supporting frame 1, and they have connection through the medium of links 57 with hand levers 58, upwardly of the pivots of said hand lever. These hand levers 58 carry the usual type of dog mechanisms 59 for co-acting with the quadrants 60 to move the regulating structure 61 in adjusted position. This regulating structure 61 is provided to permit the regulation of the quantity of straw carried upwardly by the elevator structure 35, for delivering to the rotary scatterer or spreader 50 and it comprises a plurality of parallel bars 62, the lower ends of which are connected to a cross bar 63. The bars 62 extend parallel to the upper run of the conveyer or elevator 35 and their upper ends curve over the upper ends of the elevator structure as shown at 64 for guiding the straw to the rotary scatterer 50. The bars 62$^a$ at each side of the spreader structure are elongated with respect to the intermediate bar, having their end portions 65 positioned horizontally and connected by a cross bar 66, to provide a relatively rigid construction for the regulating structure 61. The bar 56 is connected at its forward end to one of the inclined parallel bars 62, and it also has an angled bar structure 67 connected thereto which is connected to one of the bars 62 for maintaining a rigid connection between each of the bars 56 and the regulating structure 61. By pivotal movement of the lever 58, the position of the inclined parallel bars 62 and 62$^a$ with respect to the points of the tines 38 may be adjusted to regulate the active length of the tines and consequently regulate the quantity of straw carried upwardly by the elevator structure.

Plates 70 are attached to the supporting frame 1 at each side thereof for preventing the straw from falling off the sides of the spreader mechanism and these guard plates have horizontal flanges 71 upon their upper edges, to prevent straw or other material being scattered or spread by the spreader mechanism from falling in the gearing and power transmitting mechanism of the spreader.

Laterally extending arms 73 are attached to each of the side rails of the supporting frame 1 near their rear ends and these arms are braced by suitable braces 74 and attaching brackets 75. Each of the arms 73 has a double tree 76 pivotally connected to its outer end, in any suitable manner, for rotating about the pivotal connection with the arm as an axis to permit the positioning of the single trees 77 either toward the arms 12 or in the opposite direction to permit the spreading machine to travel in either direction.

Summing up, generically the operation of the improved straw spreader is as follows: The draft animals are positioned facing toward the receiving ends of the straw spreader machine so that the arms 12 may be forced into a stack of straw, or analogous material and during this forward movement the teeth 24 will be moved downwardly under the pitching of the straw thereagainst until their downward movement is limited by the pins 25 striking the upper surfaces of the arms, in which position the teeth will be maintained until the team has been reversed for drawing the straw spreading machine in the opposite direction, and upon the movement of the straw spreading machine in the opposite direction or away from the straw stack, the resistance of the straw will move the teeth 24 into an upright position, they clinging to the straw and causing a load thereof to be retained upon the arms 12. The straw spreading machine may then be hauled to the field or place where it is desired to spread or scatter the straw, after which the clutch mechanism 47 is operated, to operate the elevator structure 35 and the rotary scatterer 50. However, prior to the operation of the elevator structure, the load regulating bars of the elevator structure are adjusted to regulate the quantity of straw to be elevated upon each upward run of the elevator structure. The straw will be engaged by the teeth 38 carried upwardly over the outer surfaces of the bars 62 and delivered from the upper ends of the bars to the scatterer 50 which, owing to its rotation will scatter the straw broadcast upon the field over which the spreader is traveling. If it should be desired, at any time during the scattering operation of the device, to either increase or decrease the quantity of straw scattered, the bars 62 could be adjusted by the operation of the lever 58 to cause the elevator structure to carry the desired quantity for delivery to the scatterer 50. After the straw has been removed from the rear end portions of the arms 12, there will, in the majority of cases, be portions of the straw upon the outer ends of the said arms and by operation of the lever 32, the bars 23 may be moved rearwardly toward the elevator structure 35 for permitting this elevator structure to engage the straw which has been previously carried by the forward ends of the arms and deliver it to the rotary scatterer 50.

The operator of the machine may walk behind the rear guiding wheel 8 and by manipulation of the wheel 9, steer or direct the travel of the machine. During the spreading operation, the machine is driven with the forward end or arm 12 foremost.

Changes in details may be made without departing from the spirit of this invention, but;

I claim:

1. In a straw spreader, the combination of carrying means, means for receiving the straw from the carrying means, adjustable means slidably carried by the carrying means for feeding the straw from said carrying means to said receiving means.

2. In a straw spreader, the combination of carrying means, means for receiving the straw from the carrying means, shiftable means on said carrying means, and means for shifting said shiftable means for feeding straw toward said receiving means.

3. In a straw spreader, the combination of a supporting structure, a plurality of arms carried by the supporting structure, longitudinally extending guides arranged on the arms, bars slidably mounted in the arms, teeth carried by the bars, and means for sliding the bars in said guides.

4. In a straw spreader, the combination of a supporting structure, a plurality of supporting arms, means for pivotally securing the arms to the supporting structures, means for synchronously raising and lowering the arms, guides carried by the arms, bars slidably mounted in the guides, teeth pivotally secured to the bars, and means for synchronously sliding the bars in said guides.

5. In a straw spreader, the combination of a supporting structure, a plurality of arms carried by the supporting structure, longitudinally extending guides carried by the arms, bars slidably mounted in the guides, a pair of guides carried by the supporting structure, a cross bar having its terminals slidably mounted in the guides carried by the supporting structure, means for shifting the cross bar in said last mentioned guides, forwardly extending bars secured to the cross bars, and links pivotally connecting the outer terminals of the last mentioned bars with the bars slidably mounted in the guides carried by the arms.

6. In a straw spreader, the combination of a supporting structure, a plurality of arms carried by said supporting structure and adapted to be forced into a stack of straw to receive a load of straw thereupon, means for receiving the straw from said arms, and means carried by said arms for retaining a load of straw thereon upon withdrawal of the arms from the stack and for feeding the straw thereover toward said receiving means.

7. In a straw spreader, the combination, of a supporting structure, a plurality of arms carried at one end of said supporting structure and adapted to be forced into a stack of straw to receive a load of straw thereupon, a plurality of teeth pivotally carried by said arms and adapted to be engaged in the straw to maintain the load of straw upon the arms upon withdrawal thereof from a stack, means for limiting the pivotal movement of said teeth, shiftable means carried by said bars and means for shifting said shiftable means for feeding straw rearwardly over the arm.

8. In a straw spreader, the combination, of a supporting structure, a plurality of arms carried by said supporting structure and adapted to be forced into a stack of straw to receive a load of straw thereupon, a plurality of bars slidably carried by said arms, teeth pivotally connected to said bars and adapted to engage straw to retain a load of straw upon said arms upon their withdrawal from a stack, and means for shifting the said bars to feed straw rearwardly over said arms.

9. In a straw spreader, the combination, of a supporting structure, a plurality of arms carried by said supporting structure and adapted to be forced into a stack of straw to receive a load of straw thereupon, a plurality of bars slidably carried by said arms, teeth pivotally connected to said bars and adapted to engage straw to retain a load of straw upon said arms upon their withdrawal from a stack, means for shifting the said bars to feed straw rearwardly over said arms, and means for limiting the pivotal movement of said teeth.

10. In a straw spreader, the combination of a supporting structure, a plurality of arms pivotally carried by the supporting structure, longitudinally extending guides carried by the arms, bars slidably mounted in said guides, pivoted teeth carried by said bars, a pair of spaced guides carried by the supporting structure, a pair of independent transversely extending cross bars having their terminals slidably mounted in the last mentioned guides, forwardly extending arms carried by said transversely extending cross bars, a plurality of arms carried by each of the cross bars, links connecting the cross bars with the arms and with the bars slidably carried by the arms, and independent levers for actuating said cross bars.

11. In a straw spreader, the combination of a supporting structure, a plurality of arms pivotally carried by the supporting structure, longitudinally extending guides carried by the arms, bars slidably carried by the guides, teeth pivotally secured to the bars, stops for limiting the swinging movement of the teeth, guide bars carried by the supporting structure, a pair of independent frames mounted in the last mentioned guides for sliding movement, lever and link mechanisms independently operating said frames, and a plurality of links pivotally connected to the terminals of the frames and to the arms and sliding bars.

HENRY A. SORENSON.